May 13, 1941.  H. A. HICKS  2,242,030
VEHICLE SUSPENSION
Filed July 8, 1939   2 Sheets-Sheet 2
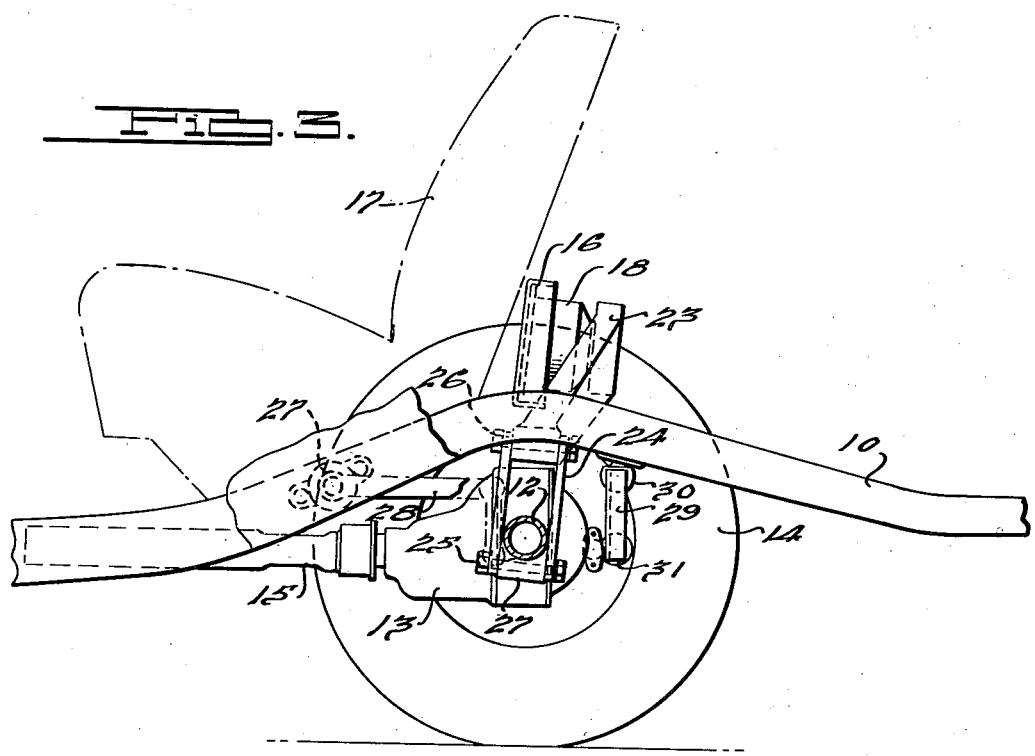
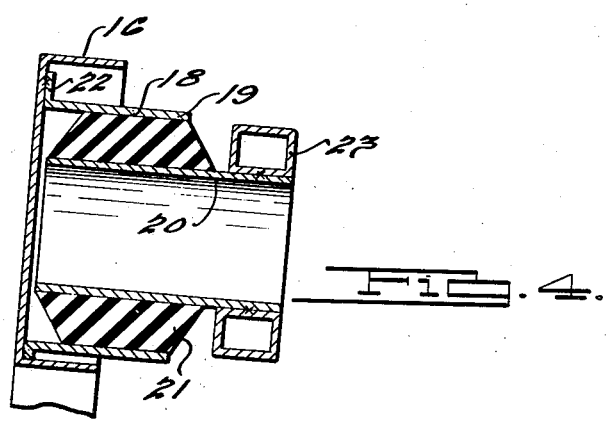
INVENTOR
Harold A. Hicks.
BY Harness, Lind, Patee & Harris
ATTORNEYS.

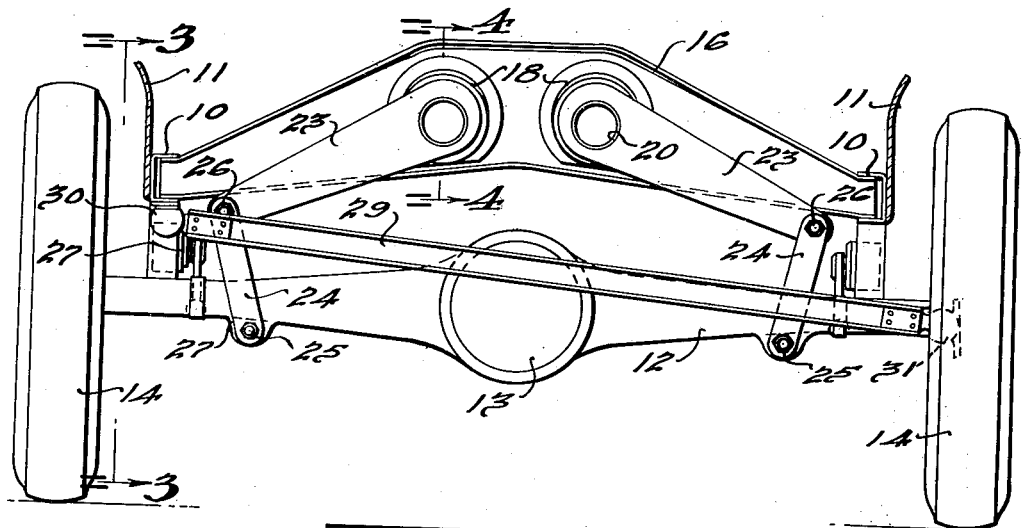
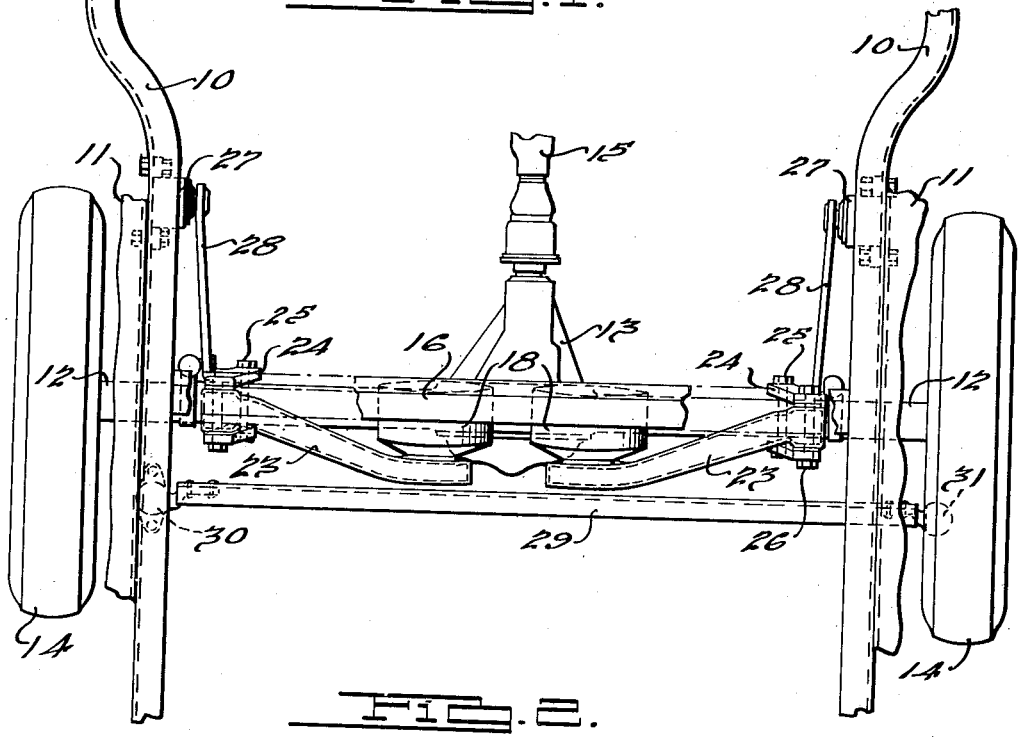

Patented May 13, 1941

2,242,030

UNITED STATES PATENT OFFICE 2,242,030

VEHICLE SUSPENSION

Harold A. Hicks, Detroit, Mich., assignor to Chrysler Corporation, Highland Park, Mich., a corporation of Delaware Application July 8, 1939, Serial No. 283,431

9 Claims. (Cl. 280—124)

This invention relates to vehicle suspension mechanism and particularly to a suspension for automotive vehicles wherein the resilient members each consists of a rubber biscuit arranged to support the load of the spring parts of the vehicle in combined compression and torsion.

The principal object of the invention is to provide a suspension of this type which is strong and durable yet of simple form and economical to manufacture.

A further object is to provide a suspension system for vehicles which requires no lubrication.

A further object is to provide a suspension for the rear axle of a motor vehicle which has noise and shock absorbing characteristics that are superior to the suspensions of the prior art.

A still further object is to provide a vehicle suspension in which the unsprung mass is less than that in present types of suspensions.

A still further object is to provide an improved vehicle suspension wherein the suspension members are disposed a substantial distance above the axle and preferably within the confines of the body.

Other objects and advantages of the invention will be apparent from the following description taken in connection with the accompanying drawings in which:

Fig. 1 is a rear elevation of the improved suspension system.

Fig. 2 is a top plan view of the same.

Fig. 3 is a view taken generally along line 3—3 of Fig. 1, and

Fig. 4 is a sectional view through one of the rubber suspension members.

Referring to the drawings in which like reference numerals designate like parts in the following description, the numeral 10 designates the chassis side sills to which the wheelhouse portions 11 of the body are attached as is conventional in the art. A rear driving axle 12 provided with the usual differential gear housing 13 has the road wheels 14 mounted at each end thereof. A propeller shaft 15 drivingly connects the differential gearing with the transmission mechanism (not shown).

A cross member 16 of channeled form interconnects the side sills 10 directly in back of the rear seat 17. As illustrated in Fig. 1, this cross member is arched upwardly and is considerably wider at its central portion than at the ends and serves as a support for the suspension members 18. The latter comprise an outer cylindrical member 19 separated from an inner cylindrical member 20 by a body of rubber 21 which is bonded to each of the cylindrical members. While rubber is preferred as the suspension medium, any of the synthetic materials having rubber-like characteristics may be substituted for the natural rubber. Likewise, changes may be made in the shape and arrangement as a whole of the suspension unit without departing from the invention.

The outer cylinder 18 of the suspension unit has a flange 22 around one end thereof for attachment to the cross member 16. Any suitable attaching means may be employed, such as welding. The inner cylinder 20 is elongated in one direction along its axis for attachment to an arm member 23 of stamped metal construction. The arm 23 is welded at one end to the cylinder 20 as shown in Fig. 4 and is attached to the axle 12 at its other end by means of a shackle 24. The latter consists of two shackle plates disposed on opposite sides of the axle 12 and pivoted thereto by a bolt 25 which passes through a boss 27 formed on the axle housing. Both the bolt 25 and the bolt 26 (which pivotally connects the shackle 24 with the arm 23) are preferably surrounded by a rubber bushing which requires no lubrication, but other types of bushings may be employed if desired.

The axes of the bolts 25 and 26 are preferably disposed in parallelism with the axis of the suspension units 18 which are inclined slightly downwardly toward the rear of the vehicle. It is preferred to arrange the angle of the axis of each unit 18 such that said axis will be parallel with the axis of the propeller shaft 15 under average load conditions. This construction minimizes the change in length of the propeller shaft as the axle rises and falls; and in addition tends to reduce harshness in the suspension.

A pair of shock absorbers 27 of any suitable type are connected to the axle 12 through arms 28. Movement of the axle transversely of the frame is controlled by the radius rod 29 which has one end universally connected to the frame 10 at 30 and its other end universally connected to brake backing plate at 31. The connections 30 and 31 are as far removed from one another as possible thereby reducing to a minimum the transverse movement of the frame relative to the axle during up-and-down movement of the latter.

By positioning the suspension units 18 above the plane of the chassis frame, lateral stability on turns is increased because the center of gravity is brought closer to the axis of the suspension and in some cases may even be below said axis. This arrangement is advantageous also in that it permits a lowering of the overall height of the vehicle and the suspension units are protected from exposure to oil, grease, mud, water, etc. Maintenance of lateral stability is also assisted by setting the shackles 24 at a slight angle so that movement of the chassis transversely to the axle will be resisted by torsional flexure of the rubber biscuits 21. If desired and where conditions permit, the shackles 24 may be set at a sufficiently divergent angle so that the sway bar or radius rod 29 may be entirely eliminated.

Both driving and braking torque may be transmitted to the frame through the units 18 thus permitting the advantages of the Hotchkiss type of drive to be realized, and rendering unnecessary the use of radius arms, torque tubes and the like which are necessary when coil springs are used as the suspension medium.

By having thus described a preferred embodiment of my invention, it is not intended to limit the same, as various changes and modifications of the details thereof will be readily apparent to those skilled in the art.

I claim:

1. In a motor vehicle, in combination, a frame; an axle carrying road wheels at each end thereof; means yieldably mounting said axle on said frame comprising a pair of suspension units including rubber subjected to torsional shear upon movement of said axle relatively to said frame; said suspension units being positioned on opposite sides of and closely adjacent to the longitudinal central vertical plane of the vehicle; a pair of arms respectively extending outwardly from said suspension units; shackle members connecting each of said arms with the housing of said axle, the said arms and shackle members being disposed entirely within the lateral confines of the frame.

2. In a motor vehicle having a frame including side sills and a wheel carrying axle, means for resiliently mounting said axle on said frame comprising a pair of arms disposed oppositely to one another transversely of said frame, shackles connecting the respective outer ends of said arms to said axle and torsional rubber means disposed closely adjacent the longitudinal vertical plane of the vehicle above the plane of said sills for mounting the respective inner ends of said arms on said frame, the outer ends of said arms connecting the said shackles at points disposed between said sills.

3. The combination according to claim 2, in which the torsional rubber means includes rubber acting in shear.

4. In a motor vehicle having a frame, a wheel carrying axle and a housing for said axle, a propeller shaft drivingly connected to said axle, means for mounting said axle housing in said frame for rising and falling movement relative thereto comprising an arm extending generally transversely of said frame and shackled to said housing at its outer end, and means for mounting the inner end of said arm on said frame for swinging movement about an axis disposed longitudinally of said vehicle and in a plane above the horizontal plane of said frame comprising, a cylindrical member fixed to said arm, a second cylindrical member surrounding said first member and fixed to said frame and a body of rubber filling the space between said members and bonded to each of them.

5. In a motor vehicle having a frame, a wheel carrying axle and a housing for said axle, a propeller shaft drivingly connected to said axle, means for mounting said axle housing on said frame for rising and falling movement relative thereto comprising an arm extending generally transversely of said frame and shackled to said housing at its outer end, and means for mounting the inner end of said arm on said frame for swinging movement about an axis parallel to the axis of said propeller shaft comprising a cylindrical member fixed to said arm, a second cylindrical member surrounding said first member and fixed to said frame and a body of rubber filling the space between said members and bonded to each of them.

6. In a motor vehicle, in combination, a body compartment, a frame having side sills and a cross member secured to and extending between said sills, said cross member being arched upwardly centrally of said frame and extending into said body compartment above the plane of said side sills, an axle for supporting said frame, means connecting said frame and axle and accommodating rising and falling movement between said frame and said axle including a torsionally yieldable suspension unit fixed to the mid-portion of said cross member.

7. In a motor vehicle, in combination, a frame having side sills and a cross member extending between said sills, said cross member being of channel form and arched upwardly centrally of said frame such that the mid-portion thereof is disposed above the plane of said side sills, an axle for supporting said frame, means connecting said frame and axle and accommodating rising and falling movement between said frame and said axle including a torsionally yieldable suspension unit fixed to the mid-portion of said cross member, said suspension unit being disposed within the flanges of said cross-member and having a yieldable member comprising rubber acting in shear.

8. In a motor vehicle, in combination, a frame having side sills and a cross member extending between said sills, said cross member being arched upwardly centrally of said frame and having a mid-portion disposed above the plane of said side sills, an axle for supporting said frame, means connecting said frame and axle and accommodating rising and falling movement between said frame and said axle including a pair of torsionally yieldable suspension units fixed to the mid-portion of said cross member, arms extending respectively outwardly from said units, and shackles interconnecting said axle and the respective outer ends of said arms, said arms and shackles being disposed entirely within said side sills.

9. In a motor vehicle having a frame and a passenger carrying seat carried by said frame, side sills comprising part of said frame; a cross-member secured to and extending between said sills adjacent said seat, said cross-member being arched upwardly centrally of said frame and having a mid-portion disposed above the plane of said sills and adjacent the back of said seat; an axle for supporting said frame; suspension means connecting said frame and axle including a pair of torsionally yieldable suspension units fixed to the mid-portion of said cross-member.

HAROLD A. HICKS.